US008942747B2

(12) United States Patent
Marsico

(10) Patent No.: US 8,942,747 B2
(45) Date of Patent: Jan. 27, 2015

(54) METHODS, SYSTEMS, AND COMPUTER READABLE MEDIA FOR PROVISIONING A DIAMETER BINDING REPOSITORY

(75) Inventor: Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/366,928

(22) Filed: Feb. 6, 2012

(65) Prior Publication Data
US 2012/0202550 A1 Aug. 9, 2012

Related U.S. Application Data

(60) Provisional application No. 61/439,672, filed on Feb. 4, 2011.

(51) Int. Cl.
*H04B 7/00* (2006.01)
*H04W 8/08* (2009.01)
(Continued)

(52) U.S. Cl.
CPC ............. *H04W 8/08* (2013.01); *H04L 67/1002* (2013.01); *H04L 61/1588* (2013.01);
(Continued)

(58) Field of Classification Search
CPC . H04L 63/0892; H04L 12/14; H04L 12/1403; H04L 45/60; H04L 45/00; H04L 45/34; H04L 45/306; H04L 67/14; H04L 63/162; H04L 63/166; H04L 65/1006; H04L 65/1043; H04L 67/1002; H04L 67/1008; H04L 67/28; H04L 67/306
USPC ........ 455/466, 515, 414.1, 67.11, 422.1, 433, 455/435, 406; 709/241, 238, 227, 229, 224, 709/230, 202, 213, 206; 379/126, 114.03, 379/114.28, 201.01, 221.08, 229, 242; 370/328, 315, 310, 310.2, 241, 235
See application file for complete search history.

(56) References Cited

U.S. PATENT DOCUMENTS 1,872,857 A 4/1931 Wesson et al.
6,298,383 B1 10/2001 Gutman et al.
(Continued)

FOREIGN PATENT DOCUMENTS

EP 1 357 720 A1 10/2003
EP 2 242 205 A1 10/2010
(Continued)

OTHER PUBLICATIONS

Notification of Transmittal of the Internation Search Report and the Written Opinion of the International Searching Authority, or the Declaration for International Patent Application No. PCT/US2012/027736 (Jun. 12, 2012).
(Continued)

*Primary Examiner* — Sujatha Sharma
(74) *Attorney, Agent, or Firm* — Jenkins, Wilson, Taylor & Hunt, P.A.

(57) ABSTRACT

Methods, systems, and computer readable media for for provisioning a Diameter binding repository (DBR) are disclosed. In one example, the method comprises receiving, at a Diameter routing node, a Diameter signaling message that is associated with a mobile subscriber and includes mobile subscriber related information. The method also includes selecting a network service node from a plurality of network service nodes configured to process the Diameter signaling message and querying a subscriber data management (SDM) node using the mobile subscriber related information to obtain additional information associated with the mobile subscriber. The method further includes generating Diameter binding record information using the mobile subscriber related information, the additional information, and an identifier corresponding to the selected network service node and providing the Diameter binding record information to a Diameter binding repository.

25 Claims, 6 Drawing Sheets

(51) Int. Cl.
*H04L 29/12* (2006.01)
*H04L 29/08* (2006.01)

(52) U.S. Cl.
CPC ........ *H04L 61/3085* (2013.01); *H04L 61/3095* (2013.01); *H04L 61/605* (2013.01); *H04L 61/6054* (2013.01)
USPC .................. 455/515; 455/414.1; 379/201.01; 379/221.08

(56) References Cited

U.S. PATENT DOCUMENTS

| | | | |
|---|---|---|---|
| 7,292,592 B2* | 11/2007 | Rune | 370/401 |
| 7,551,926 B2* | 6/2009 | Rune | 455/435.1 |
| 8,015,293 B2 | 9/2011 | Schaedler et al. | |
| 8,547,908 B2 | 10/2013 | Marsico | |
| 8,615,237 B2 | 12/2013 | Baniel et al. | |
| 2002/0147845 A1 | 10/2002 | Sanchez-Herrero et al. | |
| 2002/0194378 A1 | 12/2002 | Foti | |
| 2002/0196775 A1 | 12/2002 | Tuohino et al. | |
| 2003/0040280 A1 | 2/2003 | Koskelainen | |
| 2003/0131151 A1 | 7/2003 | Roach et al. | |
| 2004/0103157 A1 | 5/2004 | Requena et al. | |
| 2004/0152469 A1 | 8/2004 | Yla-Outinen et al. | |
| 2004/0205212 A1 | 10/2004 | Huotari et al. | |
| 2004/0223489 A1 | 11/2004 | Rotsten et al. | |
| 2004/0225878 A1 | 11/2004 | Costa-Requena et al. | |
| 2004/0246965 A1 | 12/2004 | Westman et al. | |
| 2005/0007984 A1 | 1/2005 | Shaheen et al. | |
| 2005/0009520 A1 | 1/2005 | Herrero et al. | |
| 2005/0058125 A1 | 3/2005 | Mutikainen et al. | |
| 2005/0078642 A1 | 4/2005 | Mayer et al. | |
| 2005/0094594 A1 | 5/2005 | Roh | |
| 2005/0120198 A1 | 6/2005 | Bajko et al. | |
| 2005/0124341 A1 | 6/2005 | Myllymaki et al. | |
| 2005/0136926 A1 | 6/2005 | Tammi et al. | |
| 2005/0155036 A1 | 7/2005 | Tiainen et al. | |
| 2005/0159156 A1 | 7/2005 | Bajko et al. | |
| 2005/0235000 A1 | 10/2005 | Keil | |
| 2006/0030320 A1 | 2/2006 | Tammi et al. | |
| 2006/0045249 A1* | 3/2006 | Li et al. | 379/126 |
| 2006/0068816 A1 | 3/2006 | Pelaez et al. | |
| 2006/0077926 A1* | 4/2006 | Rune | 370/328 |
| 2006/0078119 A1 | 4/2006 | Jee et al. | |
| 2006/0136557 A1 | 6/2006 | Schaedler et al. | |
| 2006/0161512 A1 | 7/2006 | Schaedler et al. | |
| 2006/0172730 A1 | 8/2006 | Matsuda | |
| 2006/0221972 A1 | 10/2006 | Bhargava et al. | |
| 2006/0259759 A1 | 11/2006 | Maino et al. | |
| 2006/0274744 A1 | 12/2006 | Nagai et al. | |
| 2007/0121596 A1 | 5/2007 | Kurapati et al. | |
| 2007/0242637 A1 | 10/2007 | Dynarski et al. | |
| 2007/0297419 A1 | 12/2007 | Askerup et al. | |
| 2008/0039104 A1 | 2/2008 | Gu et al. | |
| 2009/0080440 A1* | 3/2009 | Balyan et al. | 370/400 |
| 2009/0129271 A1 | 5/2009 | Ramankutty et al. | |
| 2009/0196231 A1 | 8/2009 | Giaretta et al. | |
| 2009/0196290 A1 | 8/2009 | Zhao et al. | |
| 2009/0221310 A1 | 9/2009 | Chen et al. | |
| 2009/0232011 A1 | 9/2009 | Li et al. | |
| 2009/0264097 A1 | 10/2009 | Cai et al. | |
| 2009/0265467 A1 | 10/2009 | Peles | |
| 2009/0305684 A1 | 12/2009 | Jones et al. | |
| 2009/0313379 A1 | 12/2009 | Rydnell et al. | |
| 2010/0290392 A1 | 11/2010 | Rasanen et al. | |
| 2010/0291923 A1 | 11/2010 | Zhou et al. | |
| 2010/0299451 A1 | 11/2010 | Yigang et al. | |
| 2010/0311392 A1* | 12/2010 | Stenfelt et al. | 455/411 |
| 2010/0331023 A1 | 12/2010 | Cai et al. | |
| 2011/0116378 A1 | 5/2011 | Ramankutty et al. | |
| 2011/0116382 A1* | 5/2011 | McCann et al. | 370/241 |
| 2011/0165901 A1 | 7/2011 | Baniel et al. | |
| 2011/0199906 A1 | 8/2011 | Kanode et al. | |
| 2011/0200053 A1* | 8/2011 | Kanode et al. | 370/401 |
| 2011/0202612 A1* | 8/2011 | Craig et al. | 709/206 |
| 2011/0202614 A1 | 8/2011 | Craig et al. | |
| 2011/0202676 A1* | 8/2011 | Craig et al. | 709/238 |
| 2011/0225113 A1 | 9/2011 | Mann | |
| 2011/0225280 A1 | 9/2011 | Delsesto et al. | |
| 2011/0225306 A1 | 9/2011 | Delsesto et al. | |
| 2011/0282904 A1 | 11/2011 | Schaedler et al. | |
| 2011/0302244 A1* | 12/2011 | McCann et al. | 709/204 |
| 2011/0314178 A1 | 12/2011 | Kanode et al. | |
| 2012/0155389 A1* | 6/2012 | McNamee et al. | 370/328 |
| 2012/0155470 A1 | 6/2012 | McNamee et al. | |
| 2012/0224524 A1 | 9/2012 | Marsico | |
| 2012/0224531 A1 | 9/2012 | Karuturi et al. | |
| 2012/0225679 A1 | 9/2012 | McCann et al. | |
| 2012/0226758 A1* | 9/2012 | Sprague et al. | 709/206 |
| 2012/0239771 A1 | 9/2012 | Rasanen | |
| 2012/0311064 A1* | 12/2012 | Deo | 709/213 |

FOREIGN PATENT DOCUMENTS

| | | |
|---|---|---|
| EP | 2 220 841 B1 | 9/2011 |
| WO | WO 2011/156274 A2 | 12/2001 |
| WO | WO 2006/066149 A2 | 6/2006 |
| WO | WO 2010/139360 A1 | 12/2010 |
| WO | WO 2011/082090 A2 | 7/2011 |
| WO | 1 846 832 B1 | 4/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |

OTHER PUBLICATIONS

Notification of Transmittal of the Internation Search Report and the Written Opinion of the International Searching Authority, or the Declaration for International Patent Application No. PCT/US2012/023971 (Jun. 11, 2012).

Calhoun et al., "Diameter Base Protcol," Network Working Group, RFC 3588 (Sep. 2003).

Notification of Transmittal of the International Search Report and the Written Opinion of the International Searching Authority, or the Declaration for International Patent Application No. PCT/US2012/027281 (Jun. 15, 2012).

Notification of Transmittal of the International Search Report and the Written Opinion of the International Searching Authority, or the Declaration for International Application No. PCT/US2012/027263 (Jun. 14, 2012).

Notification of Transmittal of the Internation Search Report and the Written Opinion of the International Searching Authority, or the Declaration for International Patent Application No. PCT/US2012/027269 (Jun. 11, 2012).

Commonly Assigned, Co-pending International Application No. PCT/US12/27736 for "Methods, Systems, and Computer Readable Media for Enriching a Diameter Signaling Message", (Unpublished, filed Mar. 5, 2012).

Commonly Assigned Co-pending U.S. Appl. No. 13/412,352 titled "Methods, Systems, and Computer Readable Media for Enriching a Diameter Signaling Message," (unpublished, filed Mar. 5, 2012).

Commonly Assigned, Co-pending International Application No. PCT/US12/27281 for "Methods, Systems, and Computer Readable Media for Hybrid Session Based Diameter Routing", (Unpublished, filed Mar. 1, 2012).

Commonly Assigned Co-pending U.S. Appl. No. 13/409,949 titled "Methods, Systems, and Computer Readable Media for Hybrid Session Bassed Diameter Routing," (unpublished, filed Mar. 1, 2012).

Commonly Assigned, Co-pending International Application No. PCT/US12/27269 for "Methods, Systems, and Computer Readable Media for Dynamically Learning Diameter Binding Information", (Unpublished, filed Mar. 1, 2012).

Commonly Assigned Co-pending U.S. Appl. No. 13/409,914 titled "Methods, Systems, and Computer Readable Media for Dynamically Learning Diameter Binding Information," (unpublished, filed Mar. 1, 2012).

(56) References Cited

OTHER PUBLICATIONS

Commonly Assigned, Co-pending International Application No. PCT/US12/27263 for "Methods, Systems, and Computer Readable Media for Sharing Diameter Binding Data", (Unpublished, filed Mar. 1, 2012).
Commonly Assigned, Co-pending U.S. Appl. No. 13/409,893 for "Methods, Systems, and Computer Readable Media for Sharing Diameter Binding Data", (Unpublished, filed Mar. 1, 2012).
Notification of Transmittal of the International Search Report and the Written Opinion of the International Searching Authotity, or the Declaration for International Application No. PCT/US2011/039285 (Feb. 9, 2012).
Notification of the Transmittal of the International Search and the Written Opinion of the International Searching Authority, or the Declaration for International Application No. PCT/US2010/061934 (Oct. 25, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnertship Project; Technical Specification Group Services and System Aspects; Policy and Charging Control Architecture (Release 11)," 3GPP TS 23.203 V11.0.1, pp. 1-137 (Jan. 2011).
"3rd Generation Partnership Project; Technical Specification Group Services and Systems Aspects; Telecommunication management; Charging management; Diameter charging applications (Release 9)," 3GPP TS 32.299, V9.4.0 (Jun. 2010).
"3rd Generation Partnership Project; Technical Specification Group Sevices and System Aspects; Telecommunication management ; Charging management; Charging architecture and principles (Release 9)," 3GPP TS 32.240, V9.1.0 (Jun. 2010).
Znaty, "Diameter, GPRS, (LTE + ePC = EPS), IMS, PCC and SDM," Effort, pp. 1-229 (Part 1 of 2) (May 2010).
Znaty, "Diameter, GPRS, (LTE + ePC = EPS), IMS, PCC and SDM," Efort pp. 230-461 (Part 2 of 2) (May 2010).
3GPP, "3rd Generation Partnership Project; Technical Specification Group Core Network and Terminals; Policy and Charging Control signalling flows and Quality of Service (Qos) parameter mapping (Release 9)," 3Rd Generation Partnership Project, TS 29.213V9.2.0, pp. 1-129 (Mar. 2010).
"3rd Generation Patnersthip Project; Technical Specification Group Core Network and Terminals; Policy and Charging Control over Gx reference point (Release 9)," GPP TS 29.212 V9.2.0 (Mar. 2010).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/8036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Commonly-assigned, co-pending U.S. Appl. No. 13/465,552 for "Method, Systems, and Computer Readable Media for Caching Call Session Control Function (CSCF) Data at a Diameter Signaling Router (DSR)," (Unpublished, filed May 7, 2012).
PCT International Patent Application No. PCT/US2012/036784, Titled, "Methods, Systems, and Computer Readable Media for Steering a Subscriber Between Access Networks," (Unpublished, Filed May 7, 2012).
Decision to grant a European patent pursuant to Article 97(1) EPC for European Application No. 05854512.0 (Mar. 15, 2012).
Communication under Rule 71(3) EPC for European application No. 05854512.0 (Nov. 11, 2011).
Notice of Allowance and Fee(s) Due for U.S. Appl. No. 11/303,757 (May 11, 2011).

Official Action for U.S. Appl. No. 11/303,757 (Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS), LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251. V9.4.0 (Oct. 2010).
Communication pursuant to Article 94(3) EPC for European Application No. 05854512.0 (Feb. 8, 2010).
Final Official Action for U.S. Appl. No. 11/303,757 (Dec. 9, 2009).
Supplementary European Search Report for European Application No. 05854512.0 (Nov. 17, 2009).
Official Action for U.S. Appl. No. 11/303,757 (May 28, 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirment for U.S. Appl. No. 11/303,757 (Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.moriangroup.com, First Edition, pp. 1-450 (Aug. 2005) (Part 1 of 2).
"Operator Guidebook to IMS and New Generation Netwroks an dServices," www.moriangroupcom, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0 pp. 1-16 (Dec. 2003).
2"All-IP Core Network Multimedia Domain," 3rd Generation Partnerships Project 2 (3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003)
"Digital Cellular Telecommunications System (Phase 2+); Universal Mobile Telecommunications System (UMTS); IP Multimedia Subsystem (IMS); Stage 2 (Release 5)," 3GPP Ts 23.228, V5.7.0, pp. 1-130 (Dec. 2002).

(56) References Cited

OTHER PUBLICATIONS

Olson et al., "Support for IPv6 in Session Description Protocol (SDP)," RCC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Non-Final Office Action for U.S. Appl. No. 13/409,949 (Feb. 15, 2013).
Non-Final Office Action for U.S. Appl. No. 13/192,410 (Dec. 20, 2012).
Non-Final Office Action for U.S. Appl. No. 13/409,893 (Dec. 13, 2012).
Commonly-assigned, co-pending U.S. Appl. No. 13/712,481 for "Methods, Systems, and Computer Readable Media for Encrypting Diameter Identification Information in a Communication Network," (Unpublished, filed Dec. 12, 2012).
Calhoun et al., "Diameter Base Protocol,"draft-ieft-aaa-diameter-07, Section 6.3, p. 68 (Jul. 2001).
Notice of Allowance and Fee(s) Due for U.S. Appl. No. 13/409,914 (Apr. 25, 2014).
Supplemental Notice of Allowability for U.S. Appl. No. 13/409,949 (Apr. 24, 2014).
Commonly-assigned, co-pending U.S. Appl. No 14/190,071 for "Methods, Systems, and Computer Program Products for Clustering and Communicating Between Internet Protocol Multimedia Subsystem (IMS) Entities and for Supporting Database Access in an IMS Network Environment," (Unpublished, filed Feb. 25, 2014).
Non-Final Office Action for U.S. Appl. No. 13/192,410 (Feb. 20, 2014).
Extended European Search Report for European Application No. 10841605.8 (Feb. 3, 2014).
Notice of Allowance and Fee(s) Due for U.S. Appl. No. 13/409,949 (Jan. 14, 2014).
Final Office Action for U.S. Appl. No. 13/409,914 (Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
Declaration of Mark Kanode for U.S. Appl. No. 13/409,893 (Nov. 1, 2013).
Advisory Action for U.S. Appl. No. 13/192,410 (Oct. 24, 2013).
Applicant-Initiated Interview Summary for U.S. Appl. No. 13/192,410 (Oct. 18, 2013).
Final Office Action for U.S. Appl. No. 13/409,949 (Sep. 19, 2013).
Advisory Action Before the Filing of an Appeal Brief for U.S. Appl. No. 13/409,949 (Sep. 13, 2013).
Notice of Allowance and Fee(s) Due for U.S. Appl. No. 12/974,869 (Aug. 19, 2013).
Final Office Action for U.S. Appl. No. 13/192,410 (Aug. 5, 2013).
"3rd Generation Partnership Project; Technical Specification Group Services and Systems Aspects; Policy and charging control architecture (Release 9)," 3GPP TS 23.203, V9.3.0 (Dec. 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csq2/3.5/installation/guide/csq3-51.pdf (Jun. 5, 2009).

\* cited by examiner

| DIAMETER SESSION-ID 302 | USER NAME 304 | IMSI 306 | IMPI 308 | IMPU 310 | SIP URI 312 | NAI 314 | MOBILE/ DIALABLE NUMBER 316 | USER IP ADDRESS 318 | CDF IDENTIFIER/ ADDRESS 320 |
|---|---|---|---|---|---|---|---|---|---|
| 123 | X | y | | | | | | Z | CDF_1 |
| 345 | | | xx | | | | | ZZ | CDF_2 |
| 678 | XXX | | | | ttt | | | ZZZ | CDF_1 |

FIG. 3

METHODS, SYSTEMS, AND COMPUTER READABLE MEDIA FOR PROVISIONING A DIAMETER BINDING REPOSITORY

PRIORITY CLAIM

This application claims the benefit of U.S. Provisional Patent Application Ser. No. 61/439,672 filed Feb. 4, 2011; the disclosure of which is incorporated herein by reference in its entirety.

TECHNICAL FIELD

The subject matter described herein relates to enhancing Diameter binding records that associate mobile subscribers with network service nodes. More specifically, the subject matter relates to methods, systems, and computer readable media for provisioning a Diameter binding repository.

BACKGROUND

At present, problems exist with the assignment of Diameter-based network service nodes to Diameter signaling messages associated with a common signaling transaction and/or mobile subscriber. Namely, there are difficulties associated with the identification and correlation of subsequently received Diameter signaling messages to the initially received Diameter signaling message transaction. As a consequence, Diameter signaling messages received at a Diameter routing node may not be forwarded to the same network service node assigned to an existing Diameter signaling message transaction that is associated with a particular mobile subscriber.

Accordingly, a need exists for improved methods, systems, and computer readable media provisioning a Diameter binding repository.

SUMMARY

Methods, systems, and computer readable media for provisioning a Diameter binding repository are disclosed. One exemplary method comprises receiving, at a Diameter routing node, a Diameter signaling message that is associated with a mobile subscriber and includes mobile subscriber related information. The method also includes selecting a network service node from a plurality of network service nodes configured to process the Diameter signaling message and querying a subscriber data management (SDM) node using the mobile subscriber related information to obtain additional information associated with the mobile subscriber. The method further includes generating Diameter binding record information using the mobile subscriber related information, the additional information, and an identifier corresponding to the selected network service node and providing the Diameter binding record information to a Diameter binding repository. As used herein, the term "node" refers to a physical computing platform including one or more hardware processors and associated memory.

The subject matter described herein may be implemented in software in combination with hardware and/or firmware. For example, the subject matter described herein may be implemented in software executed by a processor. In one exemplary implementation, the subject matter described herein for provisioning a Diameter binding repository may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 3 is an exemplary table depicting Diameter binding record data used to designate a network service node according to an embodiment of the subject matter described herein;

DETAILED DESCRIPTION

The subject matter described herein includes methods, systems, and computer readable media for provisioning a Diameter binding repository. As used herein, the term Diameter refers to the authentication, authorization, and accounting (AAA) protocol utilized by telecommunications and computer networks as defined by RFC 3588. In one embodiment, the present subject matter includes a Diameter signaling routing (DSR) node that receives a Diameter signaling message associated with a particular mobile subscriber. The received Diameter signaling message may also require processing from a particular type of network service node, such as a network charging function node (e.g., a charging data function (CDF), a policy and charging rules function (PCRF), etc.). Upon receiving the Diameter signaling message, the DSR node may be configured to either assign one of a plurality of network service nodes to process the received Diameter signaling message or determine whether a network service node is already assigned (or "bound") to the mobile subscriber. The DSR node may also be configured to query a subscriber data management (SDM) node in order to obtain additional mobile subscriber information that may be used to create or enhance a Diameter binding record in a Diameter binding repository (DBR). As used herein, a Diameter binding record may include an electronic record that includes one or more associations formed between assigned network service nodes and mobile subscriber information (e.g., identifiers). Accordingly, the enhanced Diameter binding records may be used to forward Diameter signaling messages (associated with the same mobile subscriber) subsequently received at the DSR node to an appropriate network service node with greater efficiency. In one embodiment, the present subject matter may be implemented in a Long Term Evolution (LTE) network and/or Internet protocol Multimedia Subsystem (IMS) network. Alternatively, the present subject matter may be deployed in other network implementations without departing from the scope of the present subject matter.

Figure 1:
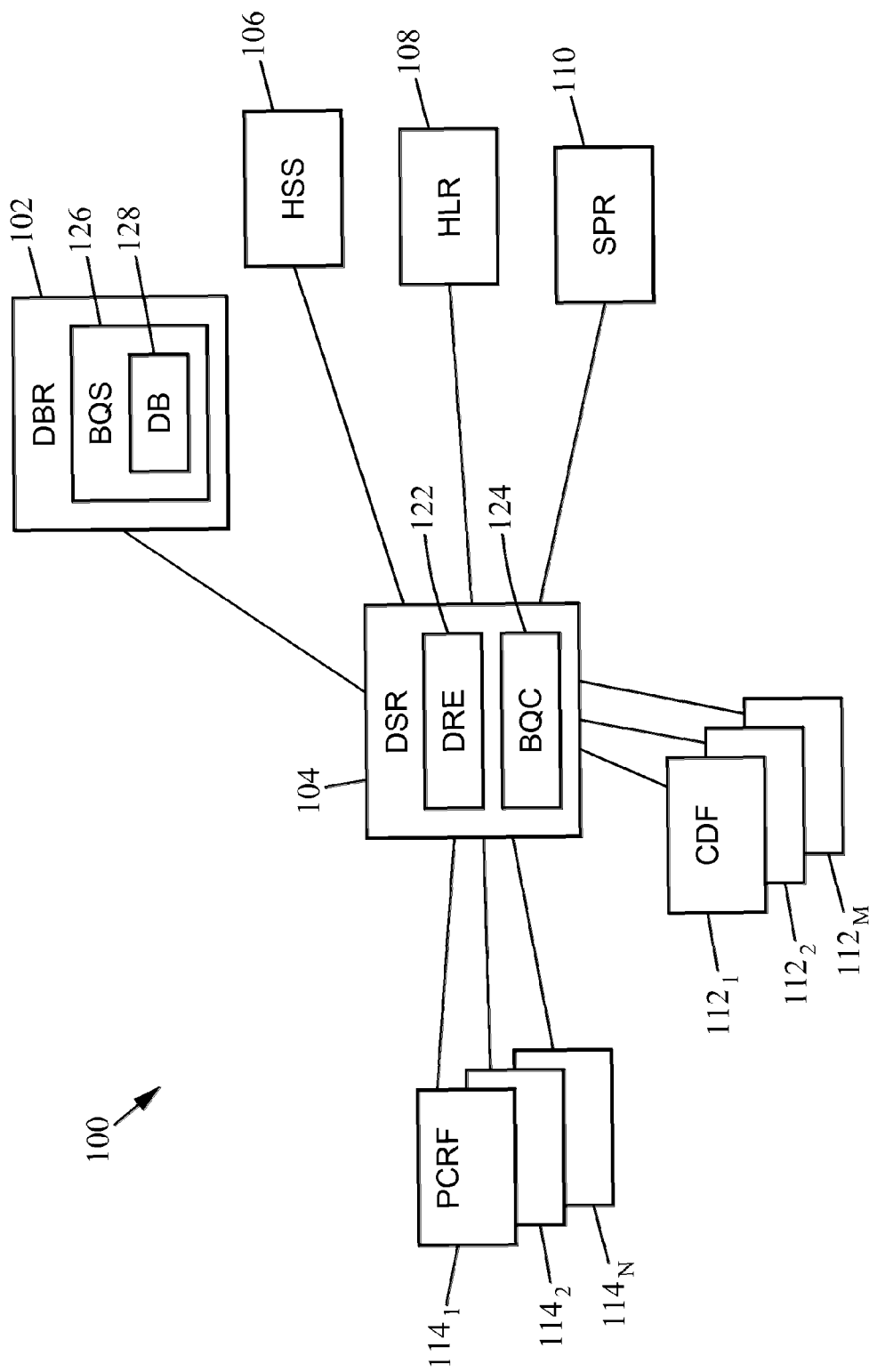
FIG. 1 is a block diagram illustrating a system for provisioning a Diameter binding repository according to an embodiment of the subject matter described herein.

FIG. 1 depicts an exemplary system 100 that includes a number of various network elements that may be utilized to provision a Diameter binding repository (DBR). In one embodiment, system 100 includes a Diameter routing node, e.g., DSR 104, configured to receive a Diameter signaling message that is associated with a mobile subscriber. Although FIG. 1 illustrates the use of a DSR, any network node that is configured to route Diameter signaling messages may be utilized without departing from the scope of the subject matter. For example, the network node may also include a Diameter routing agent (DRA), a Diameter proxy agent (DPA), a Diameter relay agent, a Diameter translation agent, and the like. In one embodiment, DSR 104 includes a Diameter routing engine (DRE) 122 that may be configured to route Diameter signaling messages between various Diameter nodes on various Diameter interfaces including, but not limited to, the Gy, Ro, Rf, and S6a interfaces. Exemplary Diameter-based signaling message received by DSR 104 include a credit control request (CCR) message, an accounting request (ACR) message, an update location request (ULR) message, a Diameter mobility management message, and a Diameter charging message. In one embodiment, the Diameter-based signaling message may be sent to the Diameter routing node by a network node (not shown) such as, for example, a policy and charging enforcement function (PCEF) node, a gateway GPRS support node (GGSN), and a public data network (PDN) gateway.

DSR 104 may also include a binding query client (BQC) 124 that is configured to communicate (e.g., send and receive) Diameter-based signaling messages to one or more DBRs (e.g., DBR 102).

In one embodiment, the Diameter signaling message received by DSR 104 may originally be destined or addressed to a network service node that is capable of processing the Diameter signaling message. Although FIG. 1 depicts an exemplary plurality of network service nodes to which the Diameter signaling message may be routed, such as CDFs $112_{1...m}$ and PCRFs $114_{1...n}$, any other type of network service node(s) configured for servicing a Diameter signaling message may be utilized in system 100 without departing from the scope of the present subject matter. For example, the network service node may include a policy and charging rules function (PCRF) node, a network charging node (e.g., a charging data function (CDF), a charging trigger function (CTF), a charging gateway function (CGF)), an online charging system (OCS) node, an offline charging system (OFCS) node, a home subscriber server (HSS) node, a home location register node (HLR), and a call session control function (CSCF) node.

System 100 may also include a plurality of subscriber data management (SDM) nodes, such as a subscriber profile repository (SPR) 110, a home subscriber server (HSS) 106, and home location register (HLR) 108. An SDM node is a designated network node configured to store and/or maintain additional mobile subscriber information, such as identifiers and service and policy profile information associated with the mobile subscriber. An SDM node may be queried by DSR 104 for the additional mobile subscriber information (e.g., identifiers). Other exemplary SDM nodes include a policy and charging rules function (PCRF) node and a call session control function (CSCF) node.

In FIG. 1, system 100 further includes a Diameter binding repository (DBR) 102 that comprises a binding query server (BQS) 126 that hosts a binding database 128. In one embodiment, binding database 128 may be configured to store Diameter binding records that provide associations (e.g., Diameter-related bindings, mappings, links, etc.) of mobile subscriber identifiers and assigned network service nodes. Exemplary Diameter-related bindings stored by DBR 102 may include, but are not limited to, a Diameter session binding, Diameter session-identifier-to-network service node associations, Diameter end-to-end identifier-to-network service node associations, mobile subscriber identifier-to-network service node associations, charging identifier (e.g., IMS charging ID)-to-network service node associations, and the like. In the embodiments illustrated herein, DBR 102 is shown as being a stand-alone entity, such as a network node, a server, an application, or a database that is located separate from the Diameter signaling router. However, DBR 102 may be co-located within a DSR or co-located within any other network node in other embodiments (not shown). Although only a single DSR and a single DBR are shown in FIG. 1, the present subject matter may include additional DSRs and DBRs that are communicatively connected to DSR 104 and DBR 104 without departing from the scope of the present subject matter.

Figure 2:
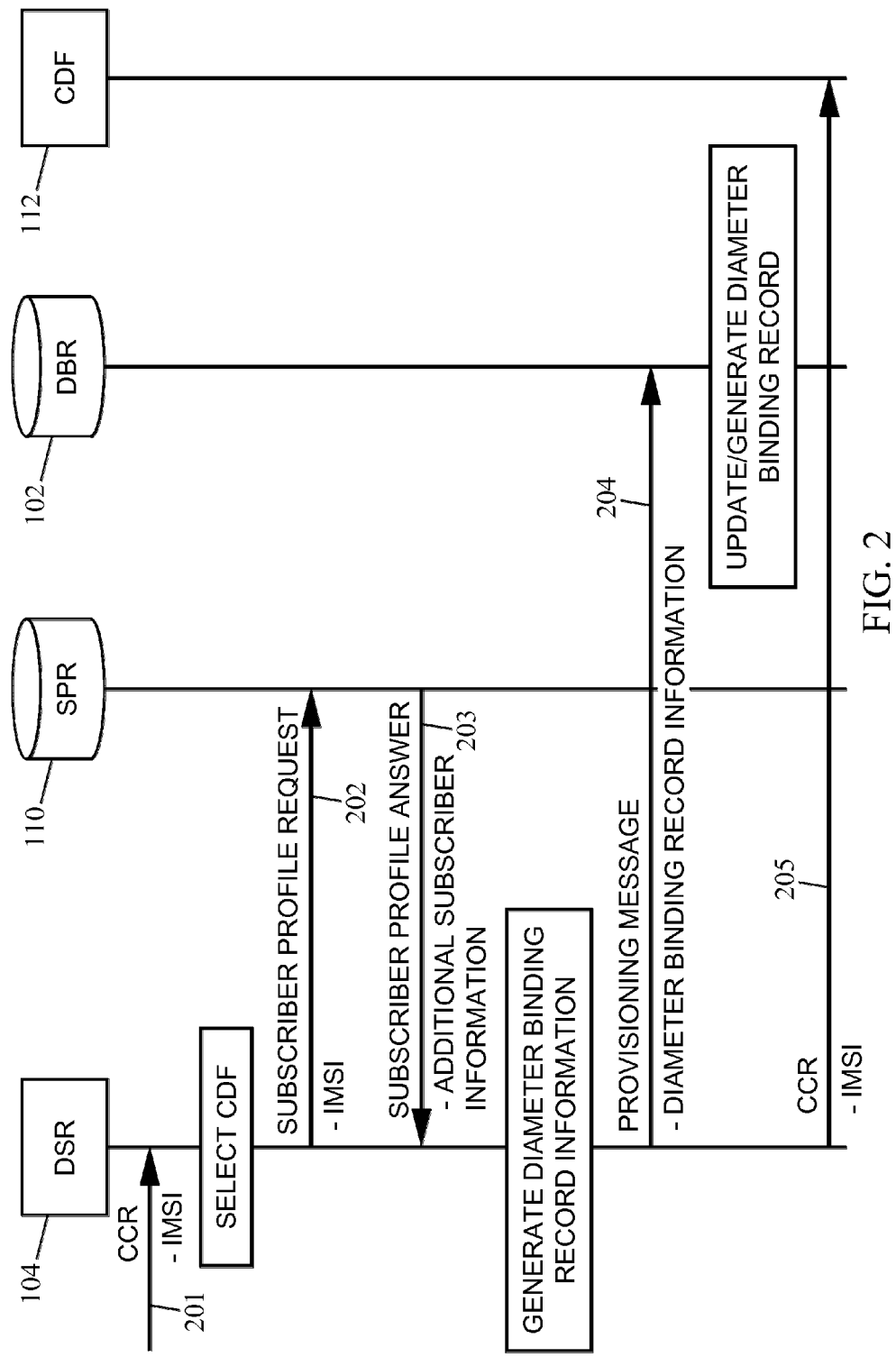
FIG. 2 is a message sequence diagram illustrating the provisioning of a Diameter binding repository according to an embodiment of the subject matter described herein.

FIG. 2 illustrates an exemplary Diameter based message sequence diagram that depicts the provisioning of a Diameter binding repository according to an embodiment of the subject matter described herein. As shown in FIG. 2, DSR 104 receives a Diameter signaling message, i.e., credit control request (CCR) message 201, which includes mobile subscriber related information. In this example, the mobile subscriber related information includes an international mobile subscriber identity (IMSI) associated with a mobile subscriber.

After receiving the Diameter request message, DSR 104 may execute a network service node selection algorithm in order to select one of the plurality of network service nodes. In one embodiment, DSR 104 may utilize a CDF selection algorithm (e.g., a software module executed by a hardware processor in DSR 104) that when executed designates one CDF node (e.g., CDF node $112_1$) from the plurality of CDF nodes CDFs $112_{1...m}$ to process the received CCR message.

In one embodiment, DSR 104 may also be configured to extract mobile subscriber related information from the received Diameter signaling message. Examples of mobile subscriber related information extracted from a Diameter signaling message include, but not limited to, Diameter session identifier information, user-name information, international mobile subscriber identity (IMSI) information, IMS private identity (IMPI) information, IMS public identity (IMPU) information, session initiation protocol (SIP) uniform resource identifier (URI) information, network access identifier (NAI) information, mobile/dialable number information, mobile subscriber directory number information, IMS charging identifier information, mobile station international subscriber directory number (MSISDN) information, and user Internet protocol (IP) address information. As previously indicated above, CCR message 201 includes IMSI information that is extracted from the message 201 by DSR 104.

In one embodiment, DSR 104 may utilize the extracted mobile subscriber related information to generate a request message to be sent to a subscriber data management (SDM) node, such as subscriber profile repository (SPR) 110. SPR 110 may be configured to store "additional" identifier data associated with a plurality of mobile subscribers. Examples of additional mobile subscriber information include parameters and identifier information such as Diameter session-identifiers, a user-name identifier, a user Internet protocol (IP) identifier, an IP multimedia subsystem (IMS) private identity (IMPI) identifier, an IMS public identity (IMPU) identifier, a session initiation protocol (SIP) uniform resource identifier (URI), an IMS charging identifier, a mobile station international subscriber directory number (MSISDN) identifier, a mobile/dialable number identifier, a session identifier, an international mobile subscriber identity (IMSI) identifier, a mobile subscriber directory number (DN) identifier, a globally unique temporary identifier (GUTI), a serving MSC address, visitor location register (VLR) number, a serving General Packet Radio Service (GPRS) support node (SGSN) address, an SGSN number information, a visited mobile country code (MCC), an mobile network code (MNC), a user-name attribute value pair (AVP), a network access identifier (NAI), a serving location area code, a serving cell identification information, mobile subscriber geo-location coordinate information, and tracking area information.

As depicted in FIG. 2, SPR 110 may receive a subscriber profile request message 202 from DSR 104 that contains the extracted mobile subscriber related information, e.g. an IMSI parameter/identifier associated with the mobile subscriber. In one embodiment, SPR 110 may be configured to cross-reference the received IMSI with a listing of mobile subscriber identifiers (e.g., a list of ISMIs). If the cross-referencing process results in locating an entry in SPR 110 that matches the extracted IMSI, SPR 110 may access the a plurality of other identifiers (i.e., additional mobile subscriber information) associated with the mobile subscriber. SPR 110 may then generate a subscriber profile answer message 203 including the additional mobile subscriber information and subsequently route answer message 203 to DSR 104. In one embodiment, the additional mobile subscriber information may include parameters/identifiers such as a user-name, a user IP address, an IMPI, and an IMPU associated with the mobile subscriber.

As depicted in FIG. 2, DSR 104 receives subscriber profile answer message 203 containing the additional mobile subscriber information from SPR 110. DSR 104 may then use the received additional mobile subscriber information along with the network service node selection information (e.g., CDF $112_1$) and the mobile subscriber related information (i.e., the IMSI) extracted from the Diameter signaling message to generate Diameter binding record information for the received Diameter signaling message. Specifically, the Diameter binding record information may serve as an association of the selected network service node to both the mobile subscriber information and the additional mobile subscriber information. For instance, using the same example above, the Diameter binding record information may associate CDF $112_1$ to the extracted IMSI and the obtained user-name, user IP address, IMPI, and IMPU.

As shown in FIG. 2, DSR 104 sends a provisioning message 204 to DBR 102. Notably, provisioning message 204 may comprise a DBR initial binding message that includes the Diameter binding record information generated by DSR 104. Upon receiving the Diameter binding record information, DBR 102 either generates a new Diameter binding record or updates an existing Diameter binding record. If DBR 102 already contains an existing Diameter binding record, DBR 102 compares the received Diameter binding record information with the data in the existing Diameter binding record and updates the record accordingly. For example, DBR 102 may compare the mobile subscriber related identifiers included in the Diameter binding record information with the mobile subscriber identifiers contained in the existing Diameter binding record. Any data or identifier included in the Diameter binding record information but not listed in the Diameter binding record is then added as new data element entries to the existing Diameter binding record. For instance, using the example above, DBR 102 may already include a binding record that associates CDF $112_1$ to the extracted IMSI and a user-name and user IP address. However, DBR 102 may determine that the existing binding record does not include the IMPI and the IMPU. As a result, DBR 102 may be configured to add the IMPI and the IMPU to the existing Diameter binding record, such that the binding record includes at least the association of CDF $112_1$ to the IMSI, the user-name, the user IP address, the IMPI, and the IMPU (i.e., the existing binding record may be previously provisioned with other mobile subscriber information not associated with the extracted mobile subscriber related information and the additional mobile subscriber information from the SDM).

Alternatively, if DBR 102 does not include an existing Diameter binding record, then DBR 102 may be configured to generate a new Diameter binding record that includes the elements contained in Diameter binding record information provided by DSR 104. For example, DBR 102 may simply generate a Diameter binding record that associates CDF $112_1$ to the IMSI, the user-name, the user IP address, the IMPI, and the IMPU.

As depicted in FIG. 2, DSR 104 then routes a Diameter signaling message 205, towards the selected network service node, i.e., CDF $112_1$. In one embodiment, Diameter signaling message 205 is the same message (i.e., CCR message 201) that was initially received by DSR 104. Although FIG. 2 depicts message 205 being sent after the Diameter binding record is created or updated, message 205 may be sent at any time after DSR 104 receives message 201. In an alternate embodiment, DSR 104 may insert some or all of the additional mobile subscriber information received from the SDM into Diameter signaling message 205. After modifying the Diameter signaling message, DSR 104 may route the modified message to or towards the network service node indicated in the DBR answer message 204.

By operating in the manner illustrated in FIG. 2, DSR 104 is able to provision DBR 102 with a plurality of bindings or associations for a plurality of received Diameter signaling messages. Notably, DBR 102 is configured to maintain network service binding records that include substantially more mobile subscriber information elements and/or parameters that are normally contained in a single Diameter signaling message. In one embodiment, the additional mobile subscriber information elements (e.g., AVP values or parameters) may be used as correlation keys by DSR 104 when analyzing/correlating a subsequently received Diameter signaling message to determine which network service node should receive and process the signaling message.

For example, after receiving, assigning (i.e., selecting a network service node), and routing the first received Diameter signaling message to CDF $112_1$, DSR 104 may subsequently receive a second Diameter signaling message that contains at least one of the same mobile subscriber information elements (e.g., AVP values or parameters) as the first Diameter signaling message. However, the second Diameter signaling message may also contain information elements that differ from the information elements included in the first Diameter request message. In one embodiment, DSR 104 is configured to analyze the information elements in the received second Diameter message and use the analysis/information in conjunction with the additional mobile subscriber information previously provided by the SDM (e.g., SPR 110). Namely, DSR 104 uses the information elements in the second Diameter signaling message to correlate the second Diameter signaling message with a previously received first Diameter signaling message. Once the correlation process has been performed by DSR 104, DSR 104 may utilize at least a portion of the mobile subscriber information contained in the second Diameter signaling message along with some or all of the additional mobile subscriber information to query DBR 102 for Diameter binding record information. After using the received information from DSR 104 to access the Diameter binding records stored in database 128, DBR 102 may then provide the preferred network service node identifier (e.g., CDF $112_1$) to DSR 104 in an answer message.

In an alternate embodiment, DSR 104 may insert some or all of the additional mobile subscriber information received from the SDM into the second Diameter signaling message. After modifying the second Diameter signaling message, DSR 104 may then route the modified message to or towards the network service node indicated in the DBR response message.

In one embodiment, a network charging function node may include an online charging system (OCS) node or offline charging system (OFCS) node. In one embodiment, an OCS node may utilize the MCC and MNC information to respond to credit control request (CCR) messages sent by policy and charging enforcement function (PCEF) nodes. As used herein, the term online charging refers to real-time management of pricing and payment processes conducted by a network charging function node (such as CDF node 112). Online charging systems are aware of each mobile subscriber's service use and account balance in real time. In one embodiment, an OCS node may be configured to customize the pricing, service delivery and marketing communication for each mobile subscriber based on the subscriber usage and current balances.

FIG. 3 illustrates an exemplary table 300 depicting Diameter binding record data used for identifying a network service node according to an embodiment of the subject matter described herein. In one embodiment, table 300 may represent at least a portion of database 128 maintained at DBR 102. Table 300 may include a plurality of mobile subscriber related identifiers 302-318 as column headers. For example, table 300 may include at least one column for each of: a Diameter session identifier 302, a user name 304, an IMPI identifier 308, an IMPU identifier 310, a SIP URI 312, an NAI 314, a mobile/dialable number 316, and a user IP address 318. Table 300 may also include a network service node column, such as a CDF identifier/address column 320. Although ten columns are depicted in FIG. 3, table 300 may include any number of columns associated with any type of identifier.

In one embodiment, DBR 102 may be configured to provision table 300. Upon receiving a provisioning message that contains Diameter binding record information (e.g., message 204 in FIG. 2), DBR 102 may add a new Diameter binding record to table 300. For example, if DBR 102 received a provisioning message that contained Diameter biding record information that included a Diameter session identifier of "678", a SIP URI of "ttt", and a user IP address of "ZZZ" associated with "CDF 1", then DBR 102 may add the new Diameter binding record represented as the last line of table 300.

Figure 4:
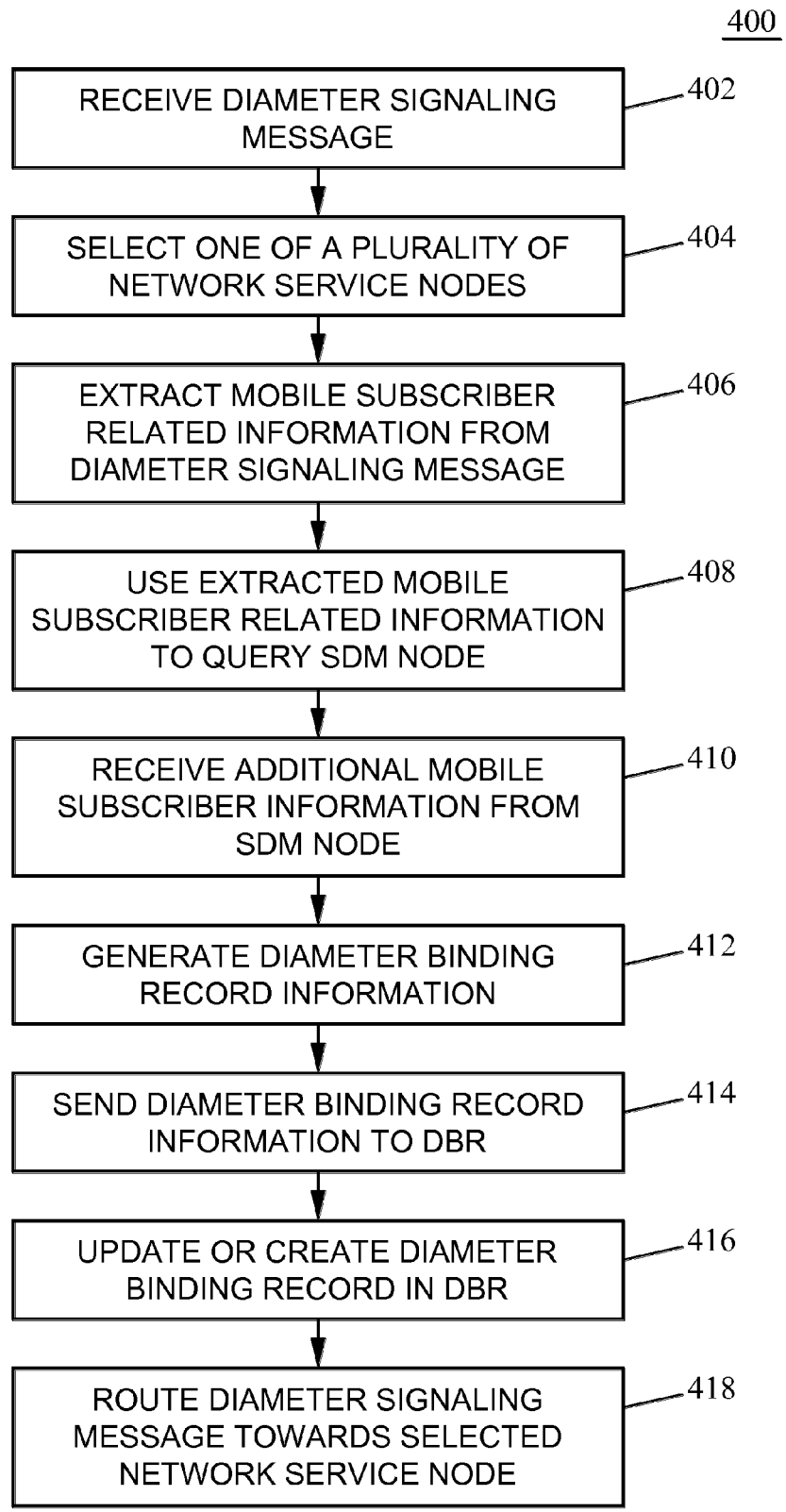
FIG. 4 is a flow chart illustrating a process for provisioning a Diameter binding repository according to an embodiment of the subject matter described herein.

FIG. 4 is a flow chart illustrating a process 400 for provisioning a Diameter binding repository (DBR) according to an embodiment of the subject matter described herein. In block 402, a Diameter signaling message associated with a mobile subscriber is received. In one embodiment, DSR 104 receives a Diameter based request message, such as a CCR message, from a sending network node.

In block 404, one of a plurality of network service nodes is selected. In one embodiment, the received Diameter signaling message may be addressed to or directed toward an original network service node destination, such as CDF $112_1$. In this scenario, DSR 104 selects/designates the address of the destination network service node as the appropriate node to process the received Diameter signaling message. In an alternate embodiment, DSR 104 may be configured to utilize a network service node selection module (e.g., a software algorithm that is executed by a hardware processor) to select one network service node from a plurality of network service nodes that are capable of servicing/processing the Diameter signaling message. For example, DSR 104 may select any one of CDF nodes $112_{1\ldots m}$ to process the CCR message received by DSR 104.

In block 406, mobile subscriber related information is extracted from the Diameter signaling message. In one embodiment, DSR 104 is configured to extract mobile subscriber related information from the received CCR message. For example, extracted mobile subscriber related information may include an IMSI associated with a particular mobile subscriber.

In block 408, a subscriber data management (SDM) node is queried. In one embodiment, DSR 104 may generate a query or request message (e.g., a subscriber profile request message) that includes the extracted mobile subscriber related information. For example, DSR 104 may extract an IMSI associated with a mobile subscriber from the received CCR message. DSR 104 may then be configured to generate a request or query message that includes the extracted IMSI. DSR 104 may also be configured to send the request message including the IMSI to an SDM, such as SPR 110.

In block 410, additional mobile subscriber information is received from the SDM node. In one embodiment, DSR 104 receives a subscriber profile answer message that contains additional information related to the mobile subscriber from SPR 110 in response to the request message sent in block 408. For example, SPR 110 may be configured to utilize the extracted mobile subscriber related information (e.g., IMSI) received in block 408 to access a local database or a storage medium that contains additional information associated with a plurality of mobile subscriber identifiers. Namely, SPR 110 may cross-reference the IMSI with a listing of mobile subscriber identifiers. If a matching entry is found (e.g., the IMSI matches one of the listed mobile subscriber identifiers in the database), then SPR 110 may access the additional information mapped to the matching mobile subscriber identifier and include the additional mobile subscriber information in an answer message (e.g., a subscriber profile answer message). SPR 110 may then send the answer message containing the additional mobile subscriber information to DSR 104. In one embodiment, the additional mobile subscriber information included in the answer message may include a user IP address, an IMPI, and an IMPU associated with the mobile subscriber.

In block 412, Diameter binding record information is generated. In one embodiment, DSR 104 uses the network service node selection information (e.g., address of CDF $112_1$), the additional mobile subscriber information obtained from SPR 110, and the extracted mobile subscriber related information (e.g., the IMSI) to generate Diameter binding record information.

In block 414, the Diameter binding record information is sent to a Diameter binding repository (DBR). In one embodiment, DSR 104 generates a DBR initial binding message that includes the Diameter binding record information and forwards the generated binding message to DBR 102.

In block 416, a Diameter binding record in the DBR is either updated or created. In one embodiment, DBR 102 utilizes the Diameter binding record information received from DSR 104 to update an existing Diameter binding record. For example, DBR 102 may compare the mobile subscriber related identifiers contained in received additional mobile subscriber information with the elements (e.g., identifiers) contained in the existing Diameter binding record. If there are any mobile subscriber related identifiers that do not match the elements contained in the existing Diameter binding record, those unmatched mobile subscriber related identifiers are added to the existing Diameter binding record. Alternatively, if DBR 102 does not include an existing Diameter binding record, then DBR 102 may be configured to generate a new Diameter binding record using the additional mobile subscriber information received from DSR 104. For example, DBR 102 creates a new entry in binding database 128 that includes the additional mobile subscriber information.

In block 418, the Diameter signaling message is routed towards the selected network service node. In one embodiment, DSR 104 routes the originally received Diameter signaling message (e.g., CCR message) to the network service node selected in block 404. For example, DSR 104 may forward the received CCR message to CDF 112₁. Alternatively, the Diameter signaling message may be routed to CDF 112₁ at any time after the network service node is selected or determined (e.g., after block 404).

Figure 5:
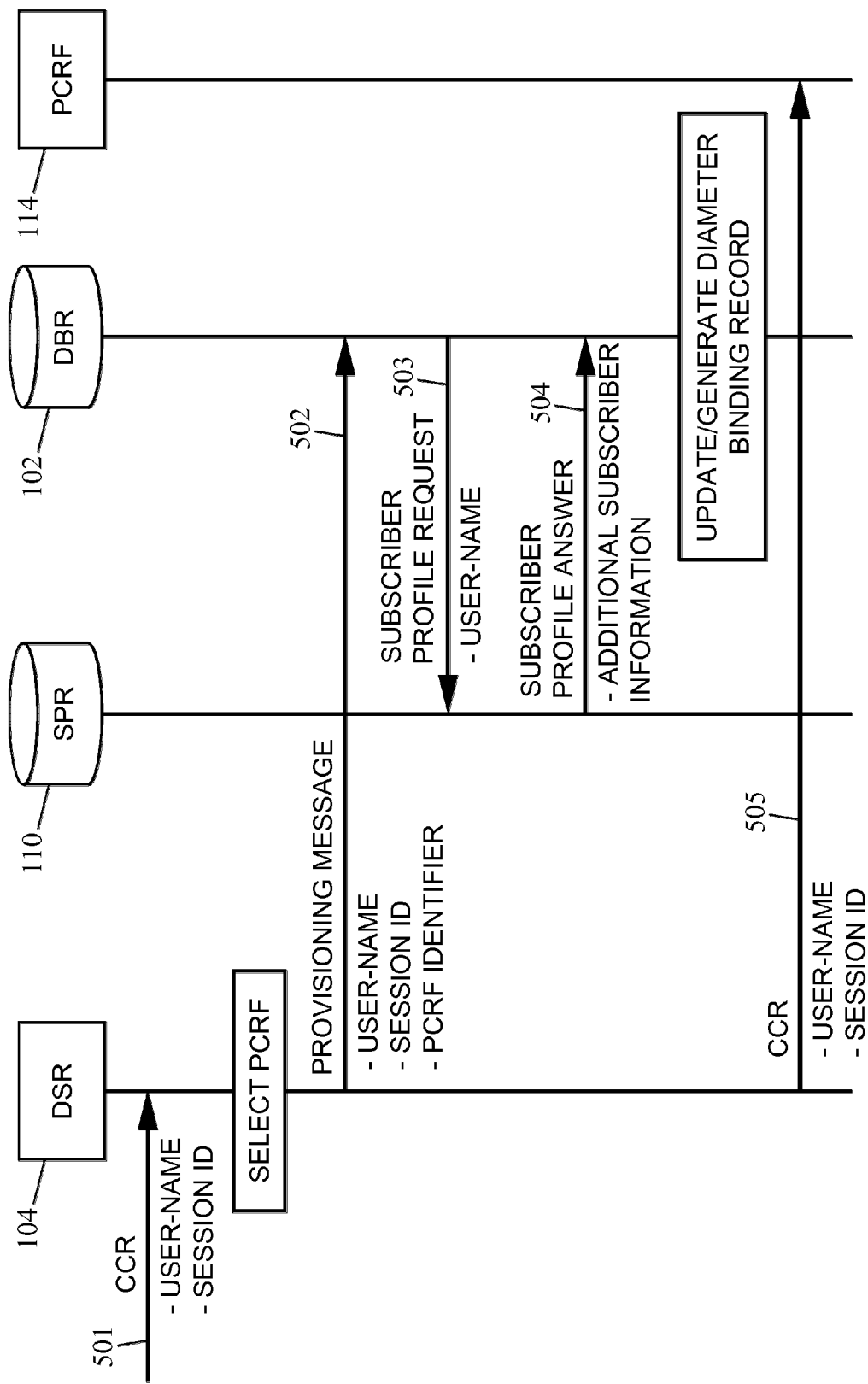
FIG. 5 is a message sequence diagram illustrating an alternative process for provisioning a Diameter binding repository according to an embodiment of the subject matter described herein.

FIG. 5 illustrates an exemplary Diameter based message sequence diagram that depicts an alternative process for provisioning a Diameter binding repository according to an embodiment of the subject matter described herein. As shown in FIG. 5, DSR 104 receives a Diameter signaling message, i.e., CCR message 501, which includes mobile subscriber related information. In this example, the mobile subscriber related information includes a user name and a session identifier (ID).

After receiving the Diameter request message, DSR 104 may execute a network service node selection algorithm in order to select one of the plurality of network service nodes. In one embodiment, DSR 104 may utilize a PCRF selection algorithm (e.g., a software module executed by a hardware processor in DSR 104) that when executed designates one PCRF node (e.g., PCRF node 114₁) from the plurality of PCRF nodes 114₁ ... n to process the received CCR message 501.

In one embodiment, DSR 104 may also be configured to extract the mobile subscriber related information from the received Diameter signaling message. As indicated above, CCR message 501 includes user name and session ID information that is extracted from the message 501 by DSR 104.

In one embodiment, DSR 104 may provide some or all of the mobile subscriber related information and an identifier corresponding to the selected network service node (e.g., PCRF node 114₁) to DBR 102 via a provisioning message 502 (e.g., a DBR initial binding message). Upon receipt of a provisioning message 502 containing the mobile subscriber related information, DBR 102 may utilize the mobile subscriber related information (e.g., user-name identifier and/or a session identifier) to generate a subscriber profile request message to a SDM node, such as SPR 110.

As depicted in FIG. 5, SPR 110 then receives a subscriber profile request message 503 from DBR 102 which contains the extracted mobile subscriber related information, e.g., a user name and/or session ID associated with the mobile subscriber. SPR 110 may be configured to cross-reference the user-name contained in received subscriber profile request message 503 with a listing of mobile subscriber identifiers (e.g., a list of mobile subscriber user-names). If the cross-referencing process results in locating an entry in SPR 110 that matches the user-name, SPR 110 may access a plurality of other associated identifiers (i.e., additional mobile subscriber information) corresponding with the mobile subscriber. In one embodiment, the identifiers or additional mobile subscriber information associated with a user-name entry may include a user IP address, an IMS private identity (IMPI), and an IMS public identity (IMPU) associated with the mobile subscriber. For example, SPR 110 may cross-reference the user-name with the entry listings of a local database. If a user-name entry that matches the extracted user-name is found in the local database in SPR 110, then SPR 110 may access a user IP address, an IMPI, and an IMPU that are associated/grouped with the matched user-name. SPR 110 may then generate a subscriber profile answer message 504 that includes the additional mobile subscriber information (e.g., user-name, user IP address, IMPI, and IMPU) and routes the subscriber profile answer message 504 to DBR 102.

As depicted in FIG. 5, DBR 102 receives the subscriber profile answer message 504 containing the additional mobile subscriber information from SPR 110. DBR 102 may then use the received additional mobile subscriber information along with the network service node selection information (e.g., PCRF 114₁) and the mobile subscriber related information to generate Diameter binding record information. In one embodiment, the received additional mobile subscriber information may be used to enhance the received additional mobile subscriber information and the network service node selection information subscriber to generate an enhanced Diameter binding record or update/enhance an existing Diameter binding record.

For example, if DBR 102 already contains an existing Diameter binding record, DBR 102 may compare the received additional mobile subscriber information, the network service node selection, and/or the mobile subscriber related information with the data in the existing binding record and update the Diameter binding record accordingly. For example, DBR 102 may compare the mobile subscriber related identifiers contained in received additional mobile subscriber information with the elements (e.g., mobile subscriber identifiers) contained in the existing Diameter binding record. If there are any mobile subscriber related identifiers that do not match the elements contained in the existing Diameter binding record, those unmatched mobile subscriber related identifiers are added to the existing Diameter binding record. Alternatively, if DBR 102 does not include an existing Diameter binding record, then DBR 102 may be configured to generate a new Diameter binding record using the additional mobile subscriber information received from SPR 110.

As depicted in FIG. 5, DSR 104 then routes a Diameter signaling message 505, towards the selected network service node, i.e., PCRF 114₁. In one embodiment, Diameter signaling message 505 is the same message (i.e., CCR message 501) that was initially received by DSR 104. Although FIG. 5 depicts message 505 being sent after DBR 102 creates or updates the Diameter binding record, message 505 may be sent at any time after DSR 104 receives message 501. In an alternate embodiment, DSR 104 may insert some or all of the additional mobile subscriber information received from the SDM into Diameter signaling message 505. After modifying the Diameter signaling message, DSR 104 may route the modified message to or towards the network service node indicated in the DBR answer message 504.

In one embodiment, after receiving, assigning (i.e., selecting a network service node), and routing the Diameter request message to PCRF 114₁, DSR 104 may receive a second Diameter-based request message that contains one or more of the same information elements (e.g., AVP values or parameters) as the first Diameter signaling message described above. However, the second Diameter request message may also contain different information elements that vary from the information elements included in the first Diameter signaling message. In one embodiment, DSR 104 is configured to analyze the information elements in the received second Diameter message and use the analysis/information in conjunction with the additional mobile subscriber information previously provided by the SDM (e.g., SPR 110). Namely, DSR 104 uses the information elements in the second Diameter message to correlate the second Diameter message with a previously received Diameter message, such as CCR message 501 shown in FIG. 5. Once the correlation process has been performed by DSR 104, DSR 104 may use at least a portion of the information contained in the second Diameter message along with some or all of the additional, correlated SDM-provided information to query DBR 102 for Diameter binding record information.

In one embodiment, if the information elements contained in the second Diameter message are different from those information elements contained in the first Diameter message, DSR 104 may be configured to determine that the first Diameter message and the second Diameter message are related and/or correlated. For example, correlation of the two Diameter signaling messages may be based on the "correlation key" information provided, at least in part, by the SDM (e.g., SPR 110, HSS, 106, and HLR 108). DSR 104 may then use at least a portion of this information to query DBR 102, which in turn may be configured to respond with the appropriate network service node (e.g., a CDF, a PCRF node, etc.) to which the second Diameter message should be routed.

In an alternate embodiment, DSR 104 may insert some or all of the additional mobile subscriber information received from the SDM into the second Diameter signaling message. After modifying the second Diameter signaling message, DSR 104 may then route the modified message to or towards the network service node indicated in the DBR response message.

Figure 6:
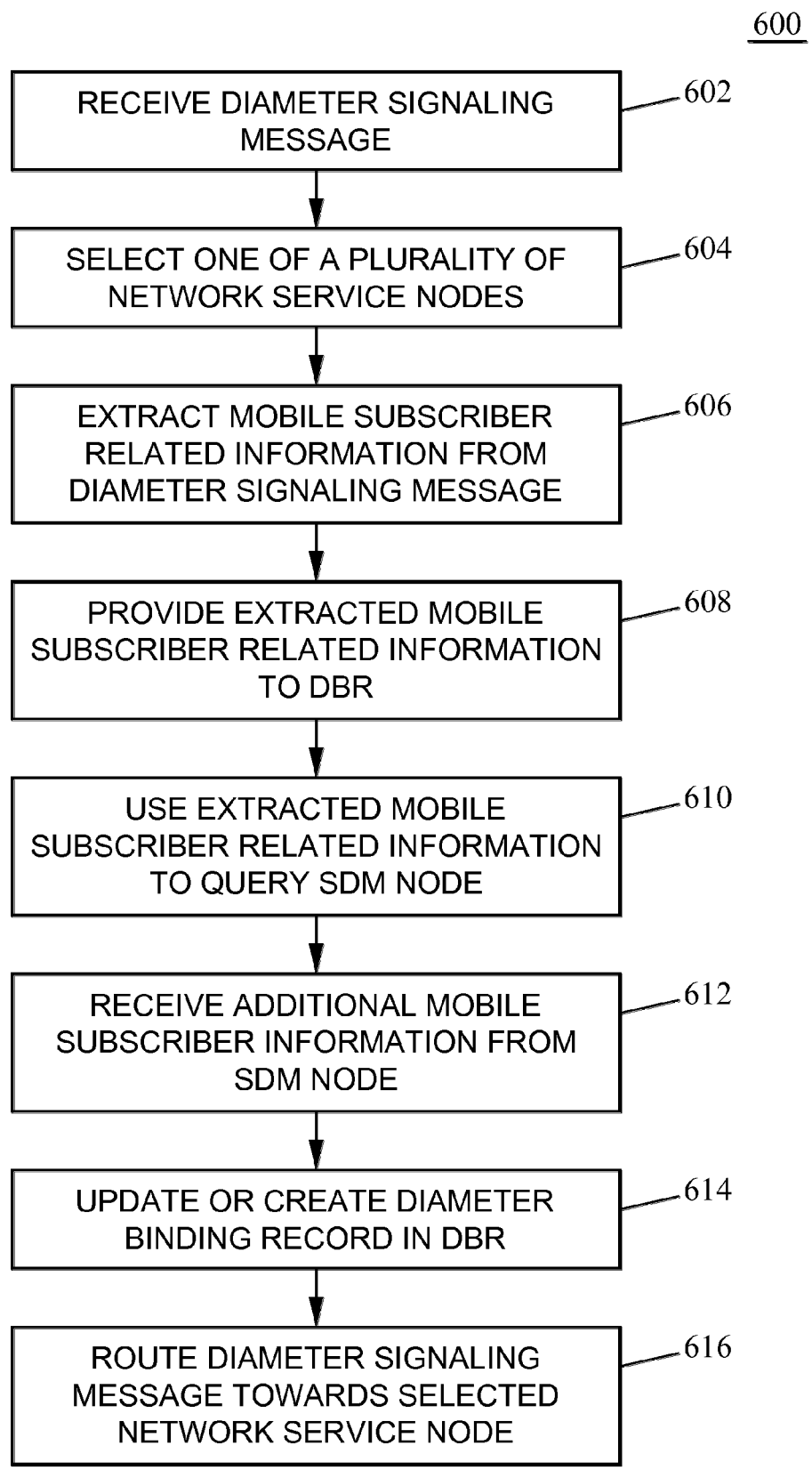
FIG. 6 is a flow chart illustrating an alternative process for provisioning a Diameter binding repository according to an embodiment of the subject matter described herein.

FIG. 6 is a flow chart illustrating a process 600 for an alternate method for provisioning a Diameter binding repository (DBR) according to an embodiment of the subject matter described herein. In block 602, a Diameter signaling message associated with a mobile subscriber is received. In one embodiment, DSR 104 receives a Diameter based request message, such as a CCR message, from a sending Diameter based node (e.g., a PCEF).

In block 604, one of a plurality of network service nodes is selected. In one embodiment, the received Diameter signaling message may be addressed to or directed toward an original network service node destination, such as PCRF 114₁. In this scenario, DSR 104 selects/designates the addressed network service node as the appropriate node to process the received Diameter signaling message. In an alternate embodiment, DSR 104 may be configured to utilize a network service node selection module (e.g., a software algorithm that is executed by a hardware processor) to instead select one network service node from a plurality of network service nodes that are capable of processing/servicing the Diameter signaling message. For example, any one of PCRF nodes 114₁ . . . ₙ may be able to process a CCR message received by DSR 104.

In block 606, mobile subscriber related information is extracted from the Diameter signaling message. In one embodiment, DSR 104 is configured to extract mobile subscriber related information from the received CCR message. For example, extracted mobile subscriber related information may include at a user-name identifier and session identifier.

In block 608, the extracted mobile subscriber related information is provided to a DBR. In one embodiment, DSR 104 generates a provisioning message or a DBR initial binding message that includes the extracted mobile subscriber related information and an identifier corresponding to the selected network service node (determined in block 604). The provisioning message containing the extracted mobile subscriber related information and network service node identifier may then be provided to DBR 102.

In block 610, a subscriber data management (SDM) node is queried. In one embodiment, DBR 102 may generate a query message that includes at least a portion of the extracted mobile subscriber related information. For example, suppose DBR 102 obtains a user-name identifier associated with a mobile subscriber from the received DBR initial binding message. DBR 102 may then be configured to generate a subscriber profile request message that includes the extracted user-name identifier. DBR 102 may also be configured to send the request message including the user-name identifier to an SDM, such as SPR 110.

In block 612, additional mobile subscriber information is received from the SDM node. In one embodiment, DBR 102 receives a subscriber profile answer message that contains additional information related to the mobile subscriber from SPR 110 in response to the subscriber profile request message sent in block 608. For example, SPR 110 may be configured to utilize the extracted mobile subscriber related information (e.g., user-name identifier) received in block 608 to access a database or a storage medium containing additional mobile subscriber information associated with a plurality of mobile subscriber identifiers. Namely, SPR 110 may cross-reference the user-name identifier with a listing of mobile subscriber identifiers. If a match is found (e.g., the user-name identifier matches one of the listed mobile subscriber identifiers in the SPR database), then SPR 110 may access the additional mobile subscriber information mapped to the matching mobile subscriber identifier and includes at least a portion of the additional mobile subscriber information in an answer message. For example, the database in SPR 110 may contain an entry that associates a user IP address, an IMS private identity, and an IMS public identity with the user-name identifier. After finding a match for the user-name identifier, SPR 110 would then generate a subscriber profile answer message containing all of these elements (i.e., mobile subscriber related identifiers). SPR 110 may then be configured to send the answer message containing the additional mobile subscriber information to DBR 102.

In block 614, a Diameter binding record in the DBR is either updated or created. In one embodiment, DBR 102 utilizes the received additional mobile subscriber information to update an existing Diameter binding record. For example, the additional mobile subscriber information is simply added to the existing information in the Diameter binding record already stored in DBR 102. Alternatively, if a Diameter binding record does not exist, DBR 102 utilizes the additional mobile subscriber information, the mobile subscriber related information, and the network service node identifier to create a new Diameter binding record. For example, DBR 102 creates a new entry in binding database 128 that includes the additional mobile subscriber information.

In block 616, the Diameter signaling message is routed towards the selected network service node. In one embodiment, DSR 104 routes the originally received Diameter signaling message (e.g., CCR message) to the network service node selected in block 604. For example, DSR 104 may forward the received CCR message to PCRF $114_1$.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for provisioning a Diameter binding repository, the method comprising:
    receiving, at a Diameter routing node, a Diameter signaling message that is associated with a mobile subscriber and includes mobile subscriber related information;
    selecting a network service node from a plurality of network service nodes configured to process the Diameter signaling message;
    querying, by the DSR, a subscriber data management (SDM) node using the mobile subscriber related information to obtain additional information associated with the mobile subscriber, wherein querying the SDM node includes querying the SDM node using an international mobile subscriber identity (IMSI);
    receiving, by the DSR, a response including the additional information that comprises at least a Diameter session identifier from the SDM node;
    generating, by the DSR, Diameter binding record information using the mobile subscriber related information, the additional information, and an identifier corresponding to the selected network service node, wherein the Diameter binding record information associates the selected network service node with both the IMSI and the Diameter session identifier; and
    sending, by the DSR to a Diameter binding repository (DBR), a provisioning message that includes the Diameter binding record information for storage in an existing Diameter binding record in the DBR, wherein the DBR is configured to be provisioned by one or more network elements that are separate from the DSR, and wherein the Diameter binding record information is used to update the existing Diameter binding record in a manner in which mobile subscriber related identifiers listed in the existing Diameter binding record are associated with both the IMSI and the additional information that includes at least the Diameter session identifier.

2. The method of claim 1 wherein the DSR provides the mobile subscriber related information and an identity of the selected service node to the Diameter binding repository and wherein the Diameter binding repository queries the subscriber data management node, obtains the additional information associated with the mobile subscriber, and generates the Diameter binding record.

3. The method of claim 1 wherein providing the Diameter binding record information includes updating an existing Diameter binding record stored in the DBR.

4. The method of claim 1 wherein providing the Diameter binding record information includes generating a new Diameter binding record that is stored in the DBR.

5. The method of claim 1 wherein the DBR is located within the DSR.

6. The method of claim 1 wherein the additional information associated with the mobile subscriber includes at least one of: Diameter session-identifier information, user-name information, a user Internet protocol (IP) information, IP multimedia subsystem (IMS) private identity (IMPI) information, IMS public identity (IMPU) information, session initiation protocol (SIP) uniform resource identifier (URI) information, IMS charging identifier information, mobile station international subscriber directory number (MSISDN) information, mobile/dialable number information, a session identifier, an international mobile subscriber identity (IMSI), a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user-name attribute value pair (AVP), a network access identifier (NAI), serving location area code information, serving cell identification information, mobile subscriber geo-location coordinate information, and tracking area information.

7. The method of claim 1 wherein the subscriber data management (SDM) node includes a subscriber profile repository (SPR) node, a network billing node, a home subscriber server (HSS) node, a home location register node (HLR), a policy and charging rules function (PCRF) node, or a call session control function (CSCF) node.

8. The method of claim 1 wherein each of the plurality of network service nodes includes at least one of: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, and a home location register node (HLR).

9. The method of claim 1 wherein the Diameter binding record includes at least one of: a Diameter session binding, a Diameter session identifier-to-network service node association, a Diameter end to end identifier-to-network service node association, a subscriber identifier-to-network service node association, and a charging identifier-to-network service node association.

10. The method of claim 1 wherein receiving the Diameter signaling message includes receiving a credit control request (CCR) message, an accounting request (ACR) message, an update location request (ULR) message, a Diameter mobility management message, or a Diameter charging message.

11. The method of claim 1 comprising modifying the Diameter signaling message to include at least a portion of the additional information.

12. The method of claim 1 comprising routing the Diameter signaling message to the selected network service node.

13. A system for provisioning a Diameter binding repository, the system comprising:
    a Diameter binding repository (DBR) configured to store Diameter binding records for binding Diameter signaling message information to Diameter transactions; and
    a Diameter signaling router (DSR) configured to receive a Diameter signaling message that is associated with a mobile subscriber and includes mobile subscriber related information, to select a network service node from a plurality of network service nodes configured to process the Diameter signaling message, to query a subscriber data management (SDM) node using the mobile subscriber related information that includes an international mobile subscriber identity (IMSI) to obtain additional information associated with the mobile subscriber, to receive a response including the additional information that comprises at least a Diameter session identifier from the SDM node, to generate Diameter binding record information using the mobile subscriber related information, the additional information, and an identifier corresponding to the selected network service node, wherein the Diameter binding record information associates the selected network service node with both the IMSI and the Diameter session identifier, and to send a provisioning message to the DBR that includes the Diameter binding record information to be stored in the DBR, wherein the DBR is configured to store the Diameter binding repository information in a Diameter binding record and is configured to be provisioned by one or more network elements that are separate from the DSR; wherein the Diameter binding record information is used to update the existing Diameter binding record in a manner in which mobile subscriber related identifiers listed in the existing Diameter binding record are associated with both the IMSI and the additional information that includes at least the Diameter session identifier.

14. The system of claim 13 wherein the Diameter binding repository is configured to query the subscriber data management node to obtain the additional information regarding the mobile subscriber and to generate the Diameter binding record.

15. The system of claim 13 wherein the DBR is configured to update an existing Diameter binding record stored in the DBR.

16. The system of claim 13 wherein the DBR is configured to generate and store a new Diameter binding record.

17. The system of claim 13 wherein the DBR is located within the Diameter signaling router (DSR).

18. The system of claim 13 wherein the additional information associated with the mobile subscriber includes at least one of: Diameter session-identifier information, user-name information, a user Internet protocol (IP) information, IP multimedia subsystem (IMS) private identity (IMPI) information, IMS public identity (IMPU) information, session initiation protocol (SIP) uniform resource identifier (URI) information, IMS charging identifier information, mobile station international subscriber directory number (MSISDN) information, mobile/dialable number information, a session identifier, an international mobile subscriber identity (IMSI), a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user-name attribute value pair (AVP), a network access identifier (NAI), serving location area code information, serving cell identification information, mobile subscriber geo-location coordinate information, and tracking area information.

19. The system of claim 13 wherein the subscriber data management node includes a subscriber profile repository (SPR) node, a network charging function node, a billing node, an online charging system (OCS) node, an offline charging system (OFCS) node, a home subscriber server (HSS) node, a home location register node (HLR), a policy and charging rules function (PCRF) node, or a call session control function (CSCF) node.

20. The system of claim 13 wherein each of the plurality of network service nodes includes a charging data function (CDF) node, a policy and charging rules function (PCRF) node, a home subscriber server (HSS) node, or a home location register node (HLR).

21. The system of claim 13 wherein the Diameter binding record information includes at least one of: a Diameter session binding, a Diameter session identifier-to-network service node association, a Diameter end to end identifier-to-network service node association, a subscriber identifier-to-network service node association, and a charging identifier-to-network service node association.

22. The system of claim 13 wherein the Diameter signaling message includes a credit control request (CCR) message, an accounting request (ACR) message, an update location request (ULR) message, a Diameter mobility management message, or a Diameter charging message.

23. The system of claim 13 wherein the Diameter routing node is configured to modify the Diameter signaling message to include at least a portion of the additional information.

24. The system of claim 13 wherein the DSR is configured to route the Diameter signaling message to the selected network service node.

25. A non-transitory computer readable medium comprising computer executable instructions embodied in a computer readable medium that when executed by a processor of a computer control the computer to perform steps comprising:
receiving, at a DSR, a Diameter signaling message that is associated with a mobile subscriber and includes mobile subscriber related information;
selecting, by the DSR, a network service node from a plurality of network service nodes configured to process the Diameter signaling message;
querying, by the DSR, a subscriber data management (SDM) node using the mobile subscriber related information to obtain additional information associated with the mobile subscriber, wherein querying the SDM node includes querying the SDM node using an international mobile subscriber identity (IMSI);
receiving, by the DSR, a response including the additional information that comprises at least a Diameter session identifier from the SDM node;
generating, by the DSR, Diameter binding record information using the mobile subscriber related information, the additional information, and an identifier corresponding to the selected network service node, wherein the Diameter binding record information associates the selected network service node with both the IMSI and the Diameter session identifier; and
sending, by the DSR to a Diameter binding repository (DBR), a provisioning message that includes the Diameter binding record information for storage in the DBR, wherein the DBR is configured to be provisioned by one or more network elements that are separate from the DSR, and wherein the Diameter binding record information is used to update the existing Diameter binding record in a manner in which mobile subscriber related identifiers listed in the existing Diameter binding record are associated with both the IMSI and the additional information that includes at least the Diameter session identifier.

* * * * *